United States Patent Office 3,262,844
Patented July 26, 1966

3,262,844
METHOD OF ELIMINATING TOBACCO BLUE MOLD
David B. Campbell, Rte. 3, Hartsville, S.C.
No Drawing. Filed June 28, 1965, Ser. No. 467,727
2 Claims. (Cl. 167—24)

This invention relates to fungicides and more particularly to a fungicide and method of applying the same for eliminating fungi such as tobacco blue mold.

A common problem today is the attack made by fungi such as mold in various areas. Among the areas prone to attack by such fungi included that of the farmer and in particular the tobacco farmer whose tobacco plants are readily subject to attack by "blue mold" or what is referred to as the "downy mildew." The attack of blue mold on tobacco plants is not only severe but plants attacked seem to go down almost at once. Such blue mold attacks are very costly to the grower and tremendous sums of money are lost every year as a result.

Various control methods have been proposed for eliminating or reducing blue mold attack most of which include the use of various fungicides. Present day fungicides include not only organic chemicals but various vegetable compounds such soybean oil, cottonseed oil, tung oil, etc. However, present day fungicides not only fail to attain the desired degree of effectiveness but require repeated application of the material to the plants. A minimum of two applications a week until transplanting of the tobacco plants is completed is common. This frequent application of fungicides not only is costly from the standpoint of the material used but also from the labor required.

Accordingly, a primary object of this invention is to provide a new and novel fungicide for eliminating fungi.

Another object of this invention is to provide a new and novel method of applying a fungicide to eliminate fungi.

A further object of this invention is to provide a new and novel fungicide for eliminating plant fungi such as tobacco blue mold.

A still further object of this invention is to provide a new and novel method of applying a fungicide to plants such as tobacco plants for eliminating tobacco blue mold.

This invention further contemplates the provision of a new and novel fungicide and method of applying the same which utilizes a readily available material which may be inexpensively prepared and which virtually eliminates fungi such as tobacco blue mold upon a single application so as to eliminate plant loss and reduce material and labor costs to a grower.

Other objects and advantages of the invention will become apparent from the following description.

The objects stated above and other related objects in this invention are accomplished by preparing an extract preferably an aqueous extract of the berry of the *Melia azedarach* tree. This tree is commonly referred to as the china or chinaberry tree and the berry is often called a chinaberry. The berry extract is then applied to the locus of the fungi such as young tobacco plants in a tobacco bed with a single application only being required in most cases with the result that fungi such as tobacco blue mold is completely eliminated.

The novel features which are believed to be characteristic of the invention are set forth with particularly in the appended claims. The invention itself, however, both as to its organization and method of application may be best understood by reference to the following description.

As generally illustrative of the invention, it should be understood that the fungicide of the invention is suitable for eliminating fungi of various types but, as it is particularly suitable for use as a fungicide against tobacco blue mold, it is with reference to this use that the invention will be described hereinafter.

By way of background, tobacco mold or *Peronospora tabacina* is also referred to as downy mildew and is a fungi which generally attacks the tobacco in plant beds. Blue mold is caused by a mold-like parasite known as fungi which reproduce by means of tiny spores or "seeds" which are produced in very large numbers. Certain spores of blue mold may live over from season to season in plant refuse in the plant bed site and may be blown by the wind for many miles so that it is difficult if not impossible to prevent the spread of the disease. Blue mold is easily recognized by the development of a characteristic bluish, cottony mold on the underside of the diseased leaves. Generally, blue mold first appears in small areas scattered throughout the bed. The leaves of the infected plant are at first a lighter green color than the leaves of healthly ones. Leaves then become ruptured and finally appear to have been scalded. In the later stages of the blue mold attack, the leaves turn brown and appear burned. Most of the leaf area is killed back to the bud and a plant bed suffering severe blue mold attack has the characteristic pungent odor of decaying vegetable matter.

As specifically illustrative of the invention, the berry of an Asiatic tree commonly referred to as the china tree having the botanical name *Melia azedarach* is used. This china tree is an Asiatic tree planted in America as a shade tree and is referred to by many names such as the chinaberry tree, pride of India, pride of China, bead tree, Indian or Persian lilac, etc. In practicing the invention, berries from this tree are collected preferably in a ripe condition. Such ripe berries are easily collected after they have fallen from the tree in the ripened condition. The berries are then placed in water in a suitable container at a ratio of approximately one-half bushel of berries to one and one-half gallons of water. The water is brought to a boil and the berries boiled for approximately 10 to 15 minutes until a concentrated aqueous extract of the berries forms in the container. This extract appears in the form of a brown viscous liquid. This resulting chinaberry extract is then filtered or strained to remove the vegetable matter so that only the liquid extract remains. This liquid forms the fungicide of the invention.

In order to employ the fungicide of the invention, the chinaberry extract is then sprayed onto the young seedlings or tobacco plants in the plant bed at an early stage of growth. As a positive prevention of any blue mold attack, the plants may be sprayed prior to the presence of any mold attack but, if desired, spraying can be delayed until the first signs of the blue mold attack appears. Spraying before the mold attack absolutely eliminates the presence of any mold and spraying the plants when the mold is first detected immediately kills the fungi and the blue mold is completely eliminated. It has been found that only a single spray application of the extract of the invention need be made as this appears to be adequate to eliminate the blue mold fungi.

It can be seen that with the novel fungicide of the invention, positive elimination of tobacco blue mold may now be obtained in a simple and easy manner and that only a simple application of the fungicide not only prevents blue mold attack but completely eliminates blue mold when its presence has been detected in a tobacco bed. The various organic chemicals and poisons presently employed for blue mold control with their attendant high cost and contaminating qualities need no longer be used with the concomitant elimination of the somewhat less than completely effective results obtained with such organic fungicides. In addition, the fungicide of the invention eliminates the repeated applications required even to keep blue mold infestation to a minimum as only a single application of the fungicide of the invention need be made. Not only does this single application requirement eliminate the expensive organic materials which were required to be used in large amounts under present day practices but the ever diminishing availability and constantly rising cost of labor is reduced to an absolute minimum.

An outstanding feature of the invention is that the material from which the fungicide of the invention is obtained is a readily available berry commonly found throughout those parts of the United States where tobacco is grown. Furthermore, the process of preparing the fungicide utilizing these berries involves the use of no additional material so that the cost of the fungicide of the invention is extremely low. It should be understood that although the fungicide of the invention has been described as a concentrated aqueous extract of the berry of the *Melia Azedarach* tree it may be equally effective in powdered form or any other form suitable for application as a surface coating to the locus of the fungi such as the leaves of the tobacco plant. In addition, the fungicide of the invention is considered to be broadly effective against all types of fungi or molds. For instance, it may be equally useful in eliminating mildew from clothing and other articles or may be effective against skin fungi such as athlete's foot.

While there has been described what at present is considered to be the preferred embodiment of the invention, it will be understood by those skilled in the art that various changes and modifications may be made therein without departing from the invention and, therefore, it is the aim of the appended claims to cover all such changes and modifications as fall within the true spirit and scope of the invention.

Having thus described the invention, what is claimed is:

1. A method of eliminating tobacco blue mold which comprises the step of applying to tobacco blue mold an extract obtained by hot water extraction of the berry of the *Melia Azedarach* tree.

2. A method in accordance with claim 1 wherein said applying step includes spraying said extract on said tobacco mold.

References Cited by the Examiner

McIndoo, United States Department of Agriculture, Department Bulletin, No. 1201 (March 19, 1924), page 8.

JULIAN S. LEVITT, *Primary Examiner.*

STANLEY J. FRIEDMAN, *Assistant Examiner.*